Feb. 21, 1961 J. K. ALLEN ET AL 2,972,559
METHOD OF MAKING LAMINATED PANELS WITH
EXPANDED POLYSTYRENE CORE
Filed June 10, 1957

INVENTORS
JOHN K. ALLEN
WALTER E. BUTTERFIELD
BY
Munn & Riddy
ATTORNEYS

United States Patent Office 2,972,559
Patented Feb. 21, 1961

2,972,559
METHOD OF MAKING LAMINATED PANELS WITH EXPANDED POLYSTYRENE CORE

John K. Allen and Walter E. Butterfield, Hollister, Calif., assignors to Architectural Porcelain Constructors, Oakland, Calif., a corporation of California Filed June 10, 1957, Ser. No. 664,736
3 Claims. (Cl. 154—139)

Expanded polystyrene is a foamed plastic solid that can be used as a core in the making of insulating core panels. It is desirable to secure facing material to the opposite faces of the core and to accomplish this by the use of bonding adhesives.

Two problems presented themselves in the bonding of the facing material to the polystyrene core. The first problem was the type of adhesives that could be applied to the core faces just prior to placing the facing material on the core for bonding thereto. It was found that the liquid carrier for the adhesive attacked the polystyrene and dissolved it, and yet a liquid carrier was necessary in order that the adhesive could be sprayed onto the core faces. If heat was used for evaporating the solvents from the core face, the temperature of the heat necessary to accomplish the evaporation of the solvents was so high that the polystyrene would be melted. The prevention of the melting of the core presented the second problem to be solved.

The first problem was solved when the adhesive was sprayed upon the surface of the facing material, rather than on the polystyrene core, because the heat could be applied to the material for evaporating the solvents. The second problem was solved when the heat was applied to the layer of adhesive to evaporate the solvents which normally would attack the polystyrene to dissolve it. The temperature of the heat thus applied could be high enough to evaporate the solvents quickly and raise the temperature of the adhesive to a point where bonding would take place when the facing material was pressed against the polystyrene core. The temperature of the adhesive at this point would be higher than the melting temperature of the polystyrene; but it was found that the layer of adhesive was so thin, in comparison to the thickness of the core that the high temperature of the adhesive was quickly dissipated into the core with a resulting rapid dropping of the temperature to a point well below the melting point of the core. Therefore, the polystyrene core would not melt and there would be a perfect bond made between the core and the facing material after the solvents of the adhesive had been evaporated off and therefore could not attack the core to dissolve it.

An object of our invention is to provide a continuous process for bonding facing material to a polystyrene core by using an adhesive whose solvents would normally attack the core to dissolve it, and spraying the adhesive onto the facing material, rather than onto the core, and then driving off the solvents from the adhesive with heat that normally would melt the core. At the proper time, the facing material with its layer of tacky adhesive, minus its solvents, is pressed against the core for bonding thereto, and the higher temperature of the adhesive is quickly dissipated into the core before the heat has had an opportunity to melt the core.

Other objects and advantages will appear in the following specification, and the novel steps of the method will be pointed out in the appended claims.

Drawing

Our invention is illustrated in the accompanying drawing, forming part of this specification, in which.

Figure 3:
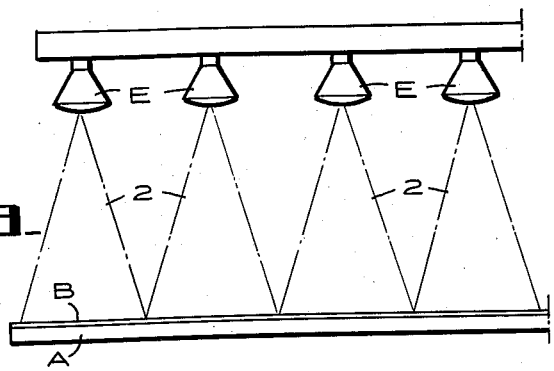
Figure 4:
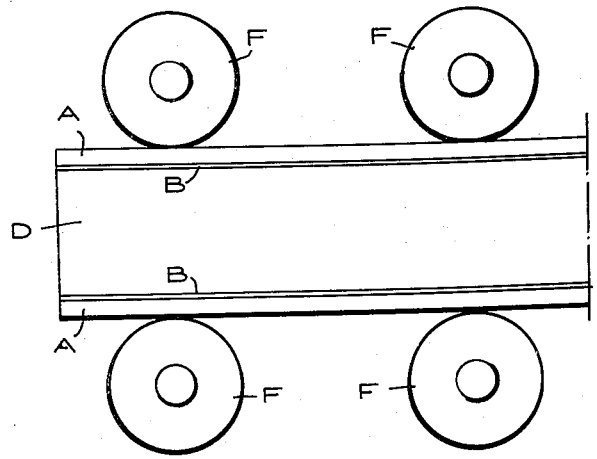

Figure 3 sets forth the second step of applying heat on the layer of adhesive for evaporating the volatile solvents; and Figure 4 shows the final step in the continuous process, and that is pressing the facing members down upon the core so that the heated adhesive will bond the facing members to the core.

While we have shown only the preferred method of making the laminated panels, it should be understood that various changes, or modifications, may be made within the scope of the annexed claims without departing from the spirit of the invention.

Description

Figure 2:
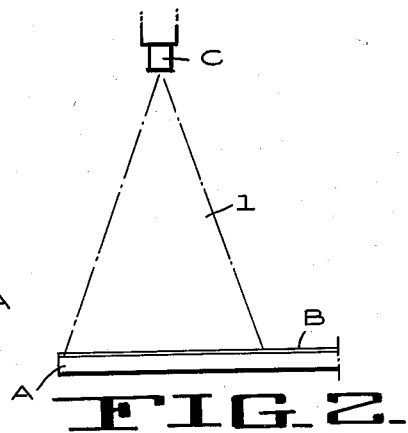
Figure 2 shows the first step of spraying an adhesive on a face member that will form a part of the completed panel.

In carrying out our invention, we take a facing member or sheet A, see Figure 2, and apply a layer of adhesive B thereto. The facing sheet A may be of any desired self-sustaining material for exterior or interior finish. The sheet A could be fireproof, such as gypsum board. The colors and surface textures can be varied. The sheet A could be a cement asbestos board. The sheet A is therefore a facing member defining a rigid slab of self-sustaining material.

The adhesive B can be applied in any manner. We have illustrated in Figure 2 the step of spraying the adhesive onto the sheet A by one or more spray guns, indicated generally at C, the spray being shown at 1. The adhesive B can be any pressure and heat sensitive type, such as Minnesota Mining Company's adhesive No. EC–1357, which comprises neoprene and resin, or their adhesive No. EC–890, which has a latex base. The Armstrong Cork Company makes an adhesive D–288, which is neoprene and a resin base, and this could also be used. In fact an adhesive having a resin base, a rubber base, or a synthetic rubber base such as neoprene, would come within the scope of the invention.

Before describing the next step of heating the adhesive layer B to drive off the volatile solvents in the adhesive, it is best to state that the core D preferably is made of foamed polystyrene that can be attacked by the solvents in the adhesive. Polystyrene, a solid, is made from carbon and hydrogen and will turn into a liquid when subjected to the liquid volatile chemicals forming the carrier for the adhesive.

Some of the liquid chemicals of the adhesive may contain ketones, such as methyl ethyl or butanone $$CH_2COCH_2CH_3$$

The liquid chemicals could be one of the aromatic solvents, such as benzene; toluene, $C_6H_5CH_3$; or xylene, $C_6H_4(CH_3)_2$.

When polystyrene, a solid, is subjected to toluene, a liquid, there is no chemical reaction, but the following equation indicates the physical change that will take place:

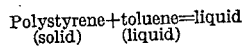

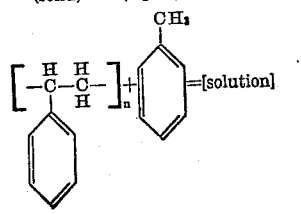

The adhesive may have a liquid carrier which may be a petroleum solvent, such as naptha, gasolene, or kerosene. These solvents would attack the polystyrene, which is a coal tar product and change it into a liquid. Therefore, it is vital that the solvents of the adhesive be evaporated off, and we accomplish this by the second step of heating the adhesive layer B. Figure 3 of the drawing schematically shows the face sheet A with its layer of adhesive B being subjected to heat rays 2 from a bank of heat-producing lamps E, or other suitable heating source. The sheet A may be moved continuously from Figure 2 where the adhesive B is sprayed onto the sheet to Figure 3, where the adhesive has its volatile constituents driven off by evaporation through heat. The temperature of the heat is higher than that which would melt the polystyrene, because the latter will melt around a temperature of 155° F. The Dow Chemical Company makes a polystyrene known as No. 33, "Styrofoam."

The temperature of the adhesive layer B on the sheet A is raised to about 180° F., to drive off the solvents and activate the adhesive to bring it to a point where it will become tacky and pressure sensitive and thus bond with the polystyrene when the sheet A is pressed down upon the core D, with the adhesive layer B being disposed therebetween. It may be wise to allow the sheet A and the adhesive layer B to cool a little after the heating step to remove all of the solvent and activate the adhesive. When the sheet A is pressed against the core D, the adhesive layer B may still be at a temperature above the melting point of the core. However, Figure 4 shows the core D considerably thicker than the adhesive layer B; and, therefore, the heat from the layer B will be quickly dissipated into the core before the polystyrene has had an opportunity of melting. Accordingly, the core will not be turned into a liquid by the solvents in the adhesive, nor will it be melted by excessive heat temperatures.

In actual practice, a laminated panel with two face members A will be made (see Figures 1 and 4). Two sheets A have a layer of adhesive B applied thereto, and both sheets are dried under the heat lamps E to evaporate the solvents from the adhesive, which otherwise would be detrimental to the core. Then a sheet A is placed on each side of the core D, at the proper instant of time, with the layers of adhesive B lying between the sheets and the core. Pressure may be applied in any manner, such as by passing the laminated panel between squeeze or pressure rollers F, which apply the proper pressure for bonding the face sheets A to the core. The laminated panel is now complete and ready for use.

Figure 1:
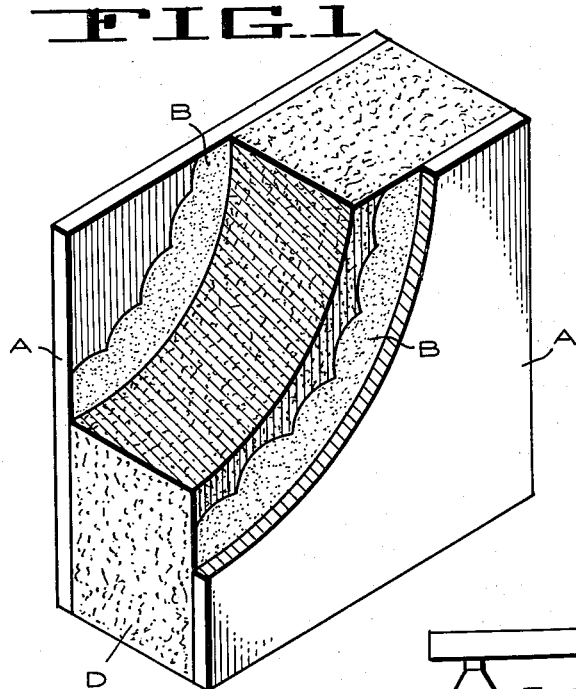
Figure 1 is a perspective view of a laminated panel with portions being broken away to disclose the various layers.

Figure 1 illustrates a panel with the different layers broken away. The face sheets are shown at A, and the adhesive layers are indicated at B. The polystyrene core D is shown. If the face sheet is of metal, it must be applied quickly to the core after the heating step; whereas, if the sheet is made of wood or a non-metallic composition, more time can be taken in bonding the sheet to the core, because the heat will dissipate more slowly.

We claim:

1. The herein described method of making a laminated panel with an expanded polystyrene core, which consists essentially of the following steps:

(a) providing a face member defining a rigid slab of self-sustaining material;

(b) spreading a layer of heat activatable adhesive onto a surface of the face member;

(c) said adhesive being of the pressure and heat sensitive type containing solvents that will attack polystyrene and turn the latter into a liquid;

(d) heating the adhesive layer to a temperature which will evaporate the solvents that would otherwise liquify the polystyrene should they come in contact therewith;

(e) the temperature of the heat being sufficiently high to activate the adhesive to render it tacky and raising the temperature thereof above the melting point of the polystyrene core;

(f) providing an expanded polystyrene core having surfaces; and (g) thereafter pressing the face member against one of the surfaces of the polystyrene core, while the temperature of the adhesive layer is still above the melting point of the polystyrene core;

(h) the polystyrene core thus provided being sufficiently thick so that it will absorb the heat dissipated from the layer of adhesive so rapidly as to lower the temperature of the layer of adhesive to a point below the melting point of the polystyrene core;

(i) whereby the face member will be permanently bonded to the polystyrene core by the tacky adhesive.

2. The method of claim 1 in which two of said face members are provided; a layer of said adhesive being applied to one surface of each of the face members; both layers of the layers of adhesive being heated to the temperature set forth; and in which the two face members are pressed simultaneously against two surfaces of the polystyrene core for causing the two face members to be permanently bonded to the core.

3. The method of making a laminated panel with an expanded polystyrene core, as defined in claim 1, and in which a layer of said adhesive is applied to a surface of a continuously moving face member; the face member being progressively moved through a heating zone of the temperature set forth; and applying the polystyrene core to the tacky adhesive by pressure after the face member has been moved away from the heating zone and while the adhesive layer is still tacky for causing the face member to permanently adhere to the polystyrene core.

References Cited in the file of this patent

UNITED STATES PATENTS

| | | |
|---|---|---|
| 2,521,470 | Matheson | Sept. 5, 1950 |
| 2,693,922 | Ellison et al. | Nov. 9, 1954 |
| 2,731,378 | Strachan | Jan. 17, 1956 |
| 2,770,406 | Lane | Nov. 13, 1956 |

FOREIGN PATENTS

| | | |
|---|---|---|
| 454,923 | Great Britain | Oct. 8, 1936 |
| 723,621 | Great Britain | Feb. 9, 1955 |

OTHER REFERENCES

Modern Plastics, "Foam and the Future," October 1950, pages 83–86 and 166 and 167.

Modern Plastics, "An Expanded Polystyrene," pages 106–109.